March 17, 1959  E. NAGEL  2,878,400
ARRANGEMENT FOR DECREASING THE REMANENCE OF
TRANSVERSE FIELD MACHINES
Filed April 19, 1957
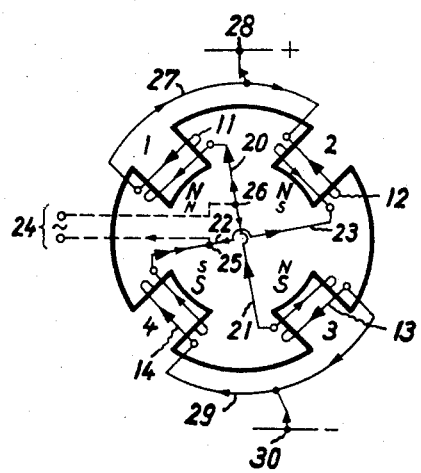
Inventor:
ERICH NAGEL
By Taulmin & Taulmin
Attorneys

United States Patent Office 2,878,400
Patented Mar. 17, 1959

2,878,400

ARRANGEMENT FOR DECREASING THE REMANENCE OF TRANSVERSE FIELD MACHINES

Erich Nagel, Berlin-Zehlendorf, Germany, assignor to Licentia Patent-Verwaltungs-G. m. b. H., Hamburg, Germany Application April 19, 1957, Serial No. 653,950

Claims priority, application Germany April 19, 1956

5 Claims. (Cl. 307—101)

This invention relates to an arrangement for decreasing the remanence of transverse field machines and more particularly of electric amplifying machines of the amplidyne type.

It is an object of the present invention to provide an arrangement for decreasing the remanence of transverse field machines in particular of the amplidyne type which permits to obtain a substantially improved efficiency in operating the machine while achieving the same decrease in the remanence of the machine as in known constructions.

It is another object of the invention to provide, in the electric machine of the type described, an arrangement for decreasing the remanence which leaves more space in the machine for the provision of control means than is the case in the machines known in the art.

The hitherto known electric amplifying machines known as transverse field machines and in particular in the machines of the amplidyne type, the remanence, i. e. the remanent magnetism in the parts of the machine which are of magnetizable material, is decreased by providing coil means associated with these parts of magnetizable material. These coil means serve for passing an alternating current therethrough and comprise individual coil portions associated with the several poles of the machine in the sequence of poles N–S–N–S, which coil portions are connected in series. Due to this sequence of the poles, these coil means cannot be used for a normal direct current excitation. Consequently, it is not possible, in the known machines, to use the space required for housing the windings of these coil means for other purposes, for instance of housing therein control means such as control windings.

These drawbacks are overcome and the objects stated above are attained by the arrangement, according to my invention, for decreasing the remanence of transverse field machines and in particular amplidyne machines, in which the alternating current excitation establishes the pole sequence N–N–S–S, while the alternating current excitation establishes the pole sequence N–S–N–S, required for decreasing the remanent magnetism of the poles of the machine.

It is a further feature of the invention that, in a plurality of poles in a circular arrangement, the coil portions associated with every two diametrically opposed poles are connected by leads with each other, which leads are in turn connected to a source of alternating current; while, according to a further feature, the windings associated with every two adjacent poles in the aforesaid circular arrangement are connected with each other by leads which are in turn connected to a source of direct current.

Transverse field machines and machines of the amplidyne type are described, for instance in the United States Patents 954,468 and 2,227,992.

The invention will be better understood by the following detailed description thereof in connection with the accompanying drawing which shows a schematical view of an embodiment of the arrangement according to the invention.

Referring now to the drawing more in detail, poles 1, 2, 3 and 4 are arranged on the periphery of the circle, in the center of which there is provided a rotor in a conventional manner, which rotor is not shown for the sake of simplifying the presentation of my invention.

Pole shoes 1, 2, 3 and 4 bear coil windings 11, 12, 13 and 14, respectively, which are wound about the aforesaid poles in such a manner that, if a direct current is caused to flow through these coil windings and the connecting leads to be explained hereinafter, pole cores 1 and 2 are excited as north poles, while poles 3 and 4 are excited as south poles. For this purpose, one end of windings 11 is connected through a lead 27 with one end of winding 12, and in this lead 27 there is provided the terminal 28 which is connected to the positive pole of a direct current source. On the other hand, one end of coil windings 13 is connected through a lead 29 to one end of the coil windings 14, while in this lead 29 there is provided the terminal 30 which is connected to the negative pole of the aforesaid direct current source.

Furthermore, the free end of coil means 11 is connected diametrically to the free end of coil means 13 via the diametric lines 20 and 21, while the free end of coil means 12 is connected diametrically to the free end of coil means 14 via lines 22 and 23. In line 22 there is provided a terminal 25 and in line 20 there is provided a terminal 26 which are both connected to the poles of a source of alternating current.

In the arrangement according to my invention, as illustrated in Figure 1, direct current flows into parallel branch circuits, one of which leads from the minus pole of the direct curent source via coil windings 13 and diametric lines 21 and 20, and through coil windings 11 to the positive pole of the direct current source. In the other branch circuit, the direct current source from the aforesaid minus pole flows through the coil windings 14 and the diametric lines 22 and 23 to the coil windings 12 and to the positive pole. Taking into account the sense of winding of the coil means about the poles, this direct current excites, in pole shoes 1, 2, 3 and 4, magnetic poles in the sequence of N–N–S–S.

The alternating current derived from the alternating current source 24 also flows through two parallel branch circuits.

One of these branch circuits is established by terminal 26, connecting line 20, pole windings 11, lead 27, pole windings 12, connecting line 23 and terminal 25. The other branch circuit for the alternating current comprises the same terminal 26, connecting line 21, pole windings 13, lead 29, pole windings 14 connecting line 22 and the other terminal 25 connected to the alternating current source 24. Taking into account the sense of winding of these coil means about the pole shoes, the flow of alternating current therethrough results in the excitation of north and south poles which are designated by N and S, respectively. These poles excited by the alternating current have the sequence N–S–N–S, pole shoe 1 being a north pole, pole shoe 2 a south pole, pole shoe 3 a north pole, and pole shoe 4 another south pole excited by the alternating current. This alternating current excitation effects the same decrease in remanent magnetism as is achieved in the machines having a conventional arrangement therefor. This arrangement according to the invention is thus characterized by the fact that one and the same coil windings of a transverse field machine are excited with direct electric current, as well as with alternating electric current for the decrease of remanence, the excitation with direct current taking place in successive poles arranged adjacent each other, while the excitation with alternating current takes place in alternating poles.

Thereby the entire available space for windings can be utilized for housing the control windings therein, while, nevertheless, the effect of remanence decrease is achieved to the same degree as in the known machines.

The applicability of the present invention is, of course, not confined to four-pole machines. It can, for example, be applied correspondingly to machines having eight poles.

It will be understood that this invention is susceptible to modification in order to adapt it to different usages and conditions, and, accordingly, it is desired to comprehend such modifications within this invention as may fall within the scope of the appended claims.

What I claim is:

1. An arrangement for decreasing the remanence in machines of the transverse field and in particular of the amplidyne type, by means of alternating current excitation, which arrangement comprises control field windings and means for passing through the same windings both alternating current for the decrease of remanence, as well as direct current for the excitation of magnetic poles in said machine.

2. An arrangement for decreasing the remanence in machines of the transverse field and in particular of the amplidyne type, by means of alternating current excitation, which arrangement comprises a plurality of control field windings, a plurality of pole shoes associated with said plurality of control field windings, respectively, and current supplying means for passing through the same windings both alternating current for the decrease of remanence, as well as direct current for the excitation of magnetic poles in said machine, said current supplying means including a direct current source connected to said coil field windings in such a manner that the resulting direct current excitation of said pole shoes establishes a pole sequence of all north poles followed by a pole sequence of all south poles, and an alternating current source connected to said control field windings in such a manner that the resulting alternating current excitation establishes an alternating sequence of north and south poles.

3. An arrangement as described in claim 2, wherein said plurality of coil means are arranged circularly, and wherein said current supplying means comprises leads connecting one end of each of every two diametrically opposed windings with each other, and connecting terminals in said leads which terminals are connected to said alternating current source.

4. An arrangement as described in claim 2, wherein said plurality of coil means are arranged circularly, and wherein said current supplying means comprises leads connecting one end of each of every two adjacent windings with each other, and connecting terminals in said leads, which terminals are connected to said direct current source.

5. An arrangement as described in claim 2, wherein said plurality of coil means are arranged circularly, and wherein said current supplying means comprises first leads connecting one end of each of every two diametrically opposed windings with each other, and first connecting terminals in said first leads which first terminals are connected to said alternating current source, second leads connecting the other end of each of every two adjacent windings with each other, and second connecting terminals in said second leads, which second terminals are connected to said direct current source.

References Cited in the file of this patent

UNITED STATES PATENTS 2,307,774    Fisher _____ Jan. 12, 1943